United States Patent Office 2,776,225
Patented Jan. 1, 1957

2,776,225

PROCESS FOR THE PRODUCTION OF A HIGHLY REFLECTANT, HEAT RESISTANT WRINKLE FINISH ON A BASE

John Fletcher, North Attleboro, Mass., assignor to National Research Corporation, Cambridge, Mass., a corporation of Massachusetts No Drawing. Application January 16, 1953,
Serial No. 331,749

4 Claims. (Cl. 117—41)

This invention relates to a process for producing a high reflectance heat-resistant wrinkle finish.

One object of this invention is to provide a process whereby articles may be coated with an easily controllable wrinkle finish.

Another object of this invention is to provide a wrinkle finish that possesses high reflectance, is resistant to heat, and has a smooth outer surface.

Other objects of the invention will in part be obvious and will in part appear hereinafter.

The invention accordingly comprises the product possessing the features, properties and the relation of components, and the process involving the several steps and the relation and the order of one or more of such steps with respect to each of the others which are exemplified in the following detailed disclosure, and the scope of the application of which will be indicated in the claims.

For a fuller understanding of the nature and objects of the invention, reference should be had to the following detailed description.

The present invention is practiced by first coating an article with a thin layer of phenyl methyl siloxane. This first coat is then partially cured and is next coated with a vacuum deposited layer of aluminum. Thereafter, another thin layer of phenyl methyl siloxane is applied and the composite coating is baked until a complete curing of both siloxane coatings is accomplished.

Heretofore, a highly reflective surface could be obtained by coating a metal surface with a suitable lacquer base coat, which is dried to a hard thin film, followed by a vacuum deposited coat of aluminum and another suitable lacquer top coat, which is also dried to a hard thin film. The finishes obtained by such a process are smooth and wrinkle-free with a high total reflectance.

The combination of aluminum and silicone resins has been employed in the past in the coating of metal articles. In this prior art work, aluminum powder is mixed with the silicone resin, applied to the article to be coated and baked. The resulting finish is a smooth wrinkle-free coating with very poor reflectance properties. Such coatings possess a total reflectance on the order of about 50 percent as measured by standard procedures.

The present invention is illustrated in the following examples which are set forth only for the purpose of illustration and are not to be construed as limiting the invention in any way.

Example I

A piece of black iron plate ("black plate"), such as that used for tin can stock, is thoroughly cleaned and dipped into a solution of phenyl methyl siloxane resin in toluol. The siloxane solution contained about 30 percent siloxane resin by weight, and the resultant thin silicone coating was about a half a mil thick (.0005 inch). This coating was then baked at 350° F. for about one and one half hours. The baking time and temperature employed were such that the siloxane resin was not completely cured. The partially cured resin was coated with a very thin deposit of aluminum, using known vacuum techniques, and then coated with another thin layer of about a half a mil (.0005 inch) of the above dissolved phenyl methyl siloxane resin. The resin top coat was baked at 500° F. for about 2 hours so as to completely cure both the base and top siloxane coatings. The black iron plate on completion of the curing was covered with a heat-resistant high reflective fine-grained wrinkle finish. The total reflectance of the coated black iron plate, as measured by standard procedures, was on the order of about 85 percent. While this coating has a wrinkled appearance, the actual wrinkle is apparently only in the lower coating, the top coating being essentially smooth and wrinkle-free.

Example II

The same procedure and conditions (baking time and temperature) were employed except that the dissolved phenyl methyl siloxane contained about 50 percent siloxane resin. The black iron plate on completion of the curing was covered with a heat-resistant high reflective coarse-grained wrinkle finish. The total reflectance of the coated article was also on the order of 85 percent.

The wrinkle finishes produced in Examples I and II were tested for heat resistance at 800° F. for 4 hours and no changes in the finishes were observed.

Although black iron plate was used in the above non-limiting examples, other metals and thermosetting plastics may be used as the base on which the novel wrinkle finish is produced. The surfaces of the articles to be coated should be thoroughly cleaned prior to coating so as to aid in the resin adhesion and to prevent blemishes in the wrinkle finish.

In order to get the desired results, it is extremely important that the siloxane resins employed possess certain properties. The siloxane resin must be capable of producing a wrinkle and should not outgas when subjected to the low pressures (.0005 mm. Hg abs. and below) necessary for the aluminum deposition. The siloxane resins must also be capable of good adhesion to the article and should also be capable of drying to a clear, hard film.

Silicone resins such as phenyl methyl siloxane

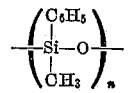

have been found to be suitable as also silicone resins modified with alkyds (for example—phenyl methyl siloxane modified with a phthalic anhydride-glycerol—fatty acid alkyd). The phenyl methyl siloxane resin may be dissolved in various solvents; however, the preferred solvents are either toluol or mineral spirits. The concentration of the siloxane resin dissolved in the solvent has a great influence on the type of wrinkle finish produced. If, for example, the amount of siloxane resin is small (40 percent or less) in the solvent solution, then a wrinkle finish which is fine-grained will be produced. On the other hand, if the amount of siloxane resin present in the solution is relatively large, 40 percent or more, then the wrinkle produced will have a correspondingly coarse grain.

The dissolved silicone resin may be applied by any one of several methods. It may be applied by spraying, dipping or roller coating depending on the object to be coated. The amount of base coating applied is of importance as it is this coating which has the greatest influence on the depth of the wrinkle. When a high siloxane resin content coating is employed, that is, a solution containing about 40 percent or more of the phenyl methyl siloxane resin, then a thickness of about a mil is applied and a coarse-grained type of wrinkle finish will be the result. For the coarsest-grain type of wrinkle, a high siloxane resin content coating of between one and two mils is preferred. When a low siloxane resin content coating is employed, that is, a solution containing about 30 percent or less of the phenyl methyl siloxane resin, then a thickness of about a half a mil is applied and a fine-grain type of wrinkle finish will be the result. For the finer-grain type of wrinkle, a low siloxane resin content coating of a half a mil or less is preferred. By controlling the phenyl methyl siloxane concentration in the solution and the amount applied to the article, it is possible to obtain various types of wrinkle finishes. The process, as is readily seen, is easily controlled to give any type of wrinkle finish and this finish is reproducible.

After the phenyl methyl siloxane resin has been applied to the article, it is baked at a temperature which is insufficient to effect complete curing of the resin. If a complete curing of the base silicone coating is effected, then a smooth wrinkle-free finish will be produced. In the baking of the base coat, the curing should always be stopped short of completion and the curing of this coating will not be completed until after the siloxane top coat has been applied.

The temperature and the time for the partial curing may be varied over a wide range, but a range of from about 250° F. to 400° F. at a time of from about a half an hour to about 2 hours is satisfactory. The preferred time and temperature, as shown in the examples, is one and a half hours at 350° F. At the times and temperatures stated above, an evaporation of the solvent and partial curing of the siloxane resin will take place. It is essential, however, that only a partial curing of the base siloxane resin take place and the time and temperature may be so varied as to obtain any desired baking period. This preliminary baking is necessary for the complete evaporation of the solvents and for the partial curing of the siloxane resin. It may also be mentioned that if it is desired pigments may be incorporated into the base coating.

After the base resin is baked to a partially cured state, it is coated with a thin deposit of aluminum in a vacuum chamber. At the low pressures required for this aluminum coating, the partially cured resin does not outgas and does not undergo any further curing during the coating operation. The thickness of the aluminum coating may vary, but a thickness of from about 3 to 4 millionths of an inch is satisfactory. After the aluminum coating has been applied, the surface is still smooth and clear without the presence of any wrinkles.

The phenyl methyl siloxane top coat may be applied in the same manner as the base coating. This top coat can be the same as the base coating, or it can preferably have a low siloxane resin content, as its function is to protect the aluminum layer and has very little influence in determining the wrinkle. The top coat should be applied so that a coating of a half a mil or less is obtained.

The final baking operation, after applying the siloxane top coat, should be such that a complete curing of both the base and top coatings is accomplished together. Again the baking time and temperature may be varied so that any desired curing time is possible. The temperature for the final curing of both siloxane layers may be in the vicinity of about 500° F. for a length of time (about 2 hours) sufficient for complete curing of both resin layers.

The final baking may be shortened by the use of very small amounts of driers such as cobalt or manganese naphthenate in the top coat. It is only during the final baking operation and complete curing of the two siloxane coatings that a wrinkle finish of high reflectance is produced. As mentioned previously, this wrinkle finish is very different from the standard wrinkle finishes in that the top surface is substantially smooth. It is believed that the wrinkled appearance is due to the fracturing of the thin aluminum layer between the two siloxane coatings. Thus the wrinkled appearance is primarily optical in nature rather than a physical wrinkling of appreciable magnitude of the base coat.

This invention provides an easy method for controlling the type of wrinkle desired and also provides a method for producing a high reflectance heat-resistant wrinkle finish.

Since certain changes may be made in the above product and process without departing from the scope of the invention herein involved, it is intended that all matter contained in the above description shall be interpreted as illustrative and not in a limiting sense.

What is claimed is:

1. A process for the production of a highly reflectant, heat-resistant wrinkle finish which has a smooth surface, the process comprising the steps of coating an article with a solution of phenyl methyl siloxane resin, baking said base resin to effect a complete solvent evaporation and partial curing of the resin, coating said partially cured resin with aluminum vaporized in a vacuum, then coating said aluminum with a phenyl methyl siloxane resin, and baking said coated article so as to completely cure both the base resin and top resin.

2. A process according to claim 1 wherein said resin comprises a major percentage of phenyl methyl siloxane modified with a phthalic anhydride-glycerol-fatty acid alkyd.

3. A process for the production of a highly reflectant, heat-resistant fine-grain wrinkle finish which comprises coating an article with a solution of phenyl methyl siloxane wherein said resin content is less than 40 percent by weight and the applied coating is thinner than about 1 mil, baking said base resin to effect a complete solvent evaporation and partial curing of the resin, coating said partially cured resin with aluminum vaporized in a vacuum, then coating said aluminum with a solution of phenyl methyl siloxane resin, and baking said coated article so as to completely cure both the base resin and top resin.

4. A process for the production of a highly reflectant, heat-resistant, coarse-grain wrinkle finish which comprises coating an article with a solution of phenyl methyl siloxane wherein said resin content is greater than 40 percent by weight and the applied coating is thicker than 1 mil, baking said base resin to effect a complete solvent evaporation and partial curing of the resin, coating said partially cured resin with aluminum vaporized in a vacuum, then coating said aluminum with a solution of phenyl methyl siloxane resin, and baking said coated article so as to completely cure both the base resin and top resin.

References Cited in the file of this patent

UNITED STATES PATENTS

| | | |
|---|---|---|
| 2,021,152 | Neuhaus | Nov. 19, 1935 |
| 2,382,432 | McManus | Aug. 14, 1945 |
| 2,586,394 | Stepien | Feb. 19, 1952 |